No. 733,605.

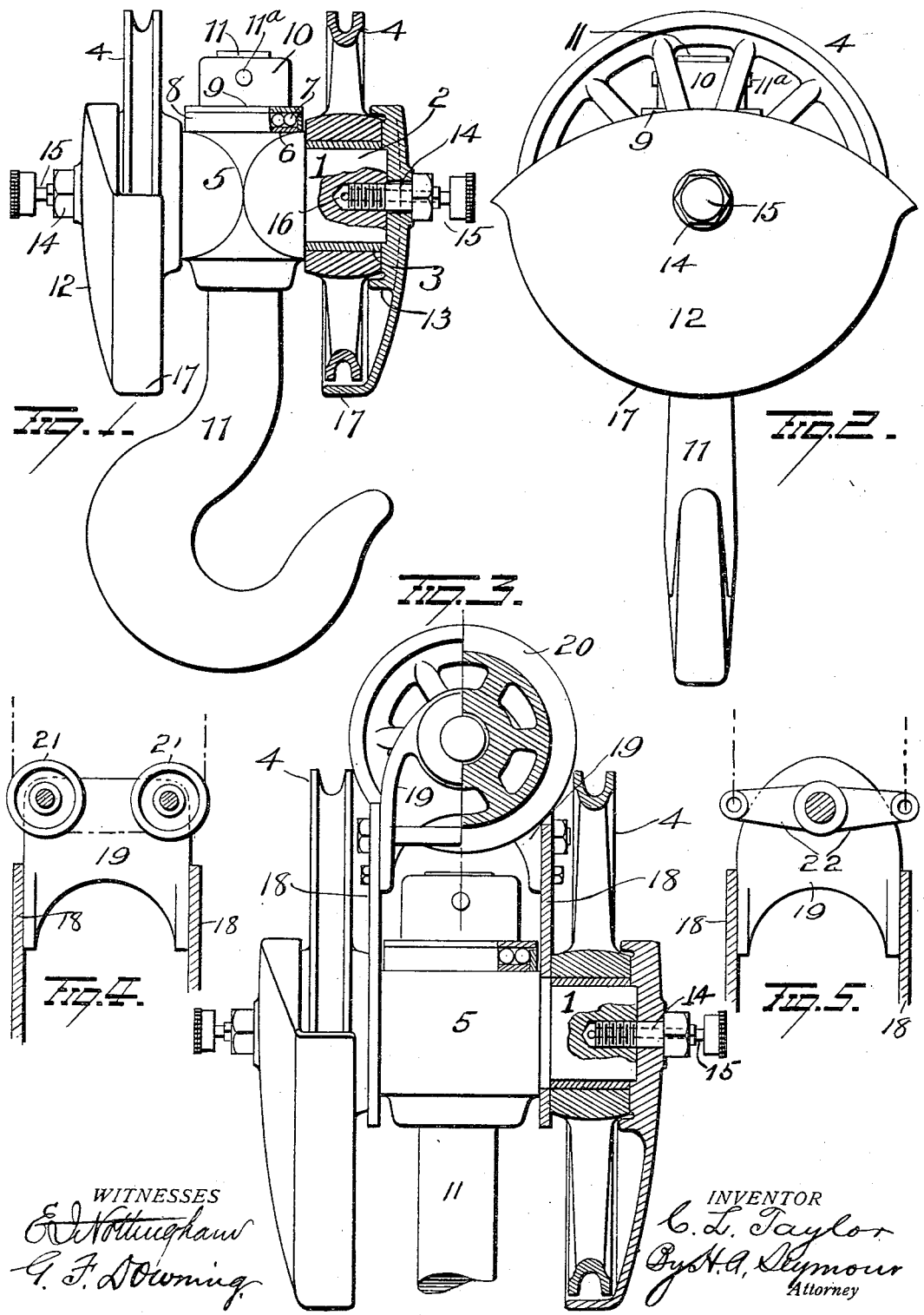

Patented July 14, 1903.

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

HOIST-BLOCK FOR CRANES OR DERRICKS.

SPECIFICATION forming part of Letters Patent No. 733,605, dated July 14, 1903.

Application filed October 13, 1902. Serial No. 127,063. (No model.)

*To all whom it may concern:*

Be it known that I, CLARENCE L. TAYLOR, of Alliance, in the county of Stark and State of Ohio, have invented certain new and useful Improvements in Hoist-Blocks for Cranes or Derricks; and I do hereby declare the following to be a full, clear, and exact description of the invention, such as will enable others skilled in the art to which it appertains to make and use the same.

My invention relates to an improvement in hoist-blocks for cranes or derricks, the object being to simplify and cheapen the construction of such blocks by dispensing with the heavy and cumbersome sheave-carrying frames ordinarily used and providing the hook beam or axle with sheave covers or guards which operate to prevent displacement of the cables or chains on the sheaves.

With these ends in view my invention consists in the parts and combination of parts and details of construction as will be more fully described, and pointed out in the claims.

In the accompanying drawings, Figure 1 is a view in front elevation, partly in section, of a block embodying my invention. Fig. 2 is an end elevation of same. Fig. 3 is a view similar to Fig. 1 of a block such as is used where the center of the chain or cable carries the block, and Figs. 4 and 5 are views of modifications.

1 represents the hook beam or axle, having cylindrical ends 2, each carrying a bushing 3, on which a sheave 4 is mounted. These sheaves are of the ordinary grooved variety and are separated by the central enlargement 5, integral with the beam or axle 1. This central enlargement forms inner bearings or abutments for the sheaves 4, and its top is made flat to form a solid rest for the washer 6, on which the antifriction-balls 7 rest and move. Surrounding the washer 6 and balls 7 is the ball-ring 8, which confines the balls on washer 6, and resting on the balls is the top washer 9, which rests on the balls 7 and carries the nut or collar 10.

The shank of hook 11 passes upwardly through the enlargement 5 of the hook beam or axle 1, through the washers 6 and 9 and the nut or sleeve 10, and is secured to the latter by screw-threads, if desired, but preferably by a pin $11^a$, passing through the nut and shank.

12 represents the sheave covers or guards, each in the shape of a segment of a circle slightly greater than the sheaves, so as to overlap the latter below the beam or axle and prevent the lateral displacement of the chain or cable. These guards or covers 12 are preferably convex externally and are thickened at the points where they engage the beam or axle and hubs of the sheaves and are provided on their inner faces each with a flange 13, which latter overlaps the hub of its sheave and forms a dust or dirt guard for preventing to a large extent the entrance of dirt or grit between the sheave-bushings and the sheaves. These guards are each secured in place by a bolt 14, passing through an opening in the guard and engaging a threaded opening in the end of the hook beam or axle. The heads of the bolts 14 bear against the outer faces of the guards and hold same in position against movement by pressure and frictional contact, and each bolt is made hollow to receive grease or other lubricant, which latter is forced into the bolt-cavity in the hook beam or axle by the screw-plunger 15. These bolt-cavities in the hook-beam or axle are slightly longer than the bolts and each is provided with a port 16, leading to the bushing 3 for the passage of the lubricant thereto.

As clearly shown in Fig. 1, the guards 12 are provided with peripheral flanges 17, which latter underlie the sheaves 4 and are in such proximity thereto as to prevent the possibility of the displacement of the cables or chains thereon.

With the block described the free ends of the chains or cables or the center of a chain would be secured to the hoist-beam of a crane or derrick and after passing under sheaves 4 return upwardly to the hoisting-drum.

Where it is necessary or desirable that the chains pass over sheaves on the crane or derrick, it is also necessary to add another sheave or sheaves or an equalizing-bar to the hook-block, and I have shown such construction in Fig. 3. In this figure the hook-block is constructed as previously described and in addition is provided with the suspension-plates 18, interposed between the hubs of the sheaves and the enlarged central portion 5 of the hook beam or axle and projecting up above the upper end of the shank of hook 11. Secured to and between the suspension-plates 18 are two parallel yokes 19, which latter form a support for the upper sheave 20, located between the yokes. This upper sheave 20 is at right angles to the two lower sheaves and is designed to engage the center of the hoist-chain. The two ends of the chain then pass upwardly around sheaves on the hoist-beam of the crane or derrick, then down and around sheaves 4, and up to the hoisting-drum.

Instead of employing a single sheave 20, as shown, two smaller sheaves 21 may be used, as shown in Fig. 4, or an equalizing-bar 22 (shown in Fig. 5) may be employed in lieu of sheaves. This sheave 20, simply supporting the center of the chain or cable, does not rotate or turn as the other sheaves, but simply permits the chain or cable to move to compensate for unequal strains. Hence two smaller sheaves or an equalizing-bar would answer the purposes of a single sheave. When the equalizing-bar is used, two chains or cables instead of a single chain or cable will be used, an end of each chain or cable being secured to the equalizing-bar and the other ends to the hoisting-drum after passing around the sheaves of the upper and lower blocks, as previously explained.

It is evident that many slight changes might be resorted to in the relative arrangement of parts herein shown and described without departing from the spirit and scope of my invention. Hence I would have it understood that I do not wish to limit myself to the exact construction of parts shown and described; but, Having fully described my invention, what I claim as new, and desire to secure by Letters Patent, is—

1. In a hoist-block, the combination with a beam or axle carrying a hook and a pair of sheaves journaled on the ends of said beam or axle, of sheave covers or guards secured to the beam or axle and extending below the sheaves.

2. In a hook-block, the combination with a beam or axle carrying a hook, and a pair of sheaves journaled on the ends of said beam or axle, of sheave-covers secured to the ends of said beam or axle and provided each with a flange resting under and in close proximity to its respective sheave.

3. In a hook-block, the combination with a beam or axle carrying a hook and a pair of sheaves journaled on the ends of said beam or axle, of sheave-covers secured to the beam, each cover having a flange embracing the outer end of the hub of its sheave and another flange resting in proximity to the under edge of the sheave.

4. In a hook-block, the combination with a beam or axle carrying a hook, and a pair of sheaves journaled on the ends of said beam or axle, of a cover or guard for each sheave, a hollow bolt securing each guard to the beam or axle, a plunger within the bolt and a port or passage-way leading from the bolt-cavity in the beam or axle to the sheave-bushing.

5. The combination with a beam or axle, a hook carried thereby, two sheaves journaled thereon, a guard for each sheave and means for securing the guards to the beam or axle, of suspension-plates in which the beam or axle is carried, and an equalizing device at the upper ends of the suspension-plates, substantially as set forth.

In testimony whereof I have signed this specification in the presence of two subscribing witnesses.

CLARENCE L. TAYLOR.

Witnesses:
JOHN H. LLOYD,
DAVID FORDING.